United States Patent Office 2,838,464
Patented June 10, 1958

2,838,464

COATING COMPOSITIONS CONTAINING NITROCELLULOSE, ALKYD RESIN AND POLYESTER PLASTICIZER, AND ARTICLE COATED THEREWITH

Walter Keigwin Moffett and John Daniel Pickens, Flint, Mich., assignors to E. I. du Pont de Nemours and Company, Wilmington, Del., a corporation of Delaware No Drawing. Application March 14, 1955
Serial No. 494,252

11 Claims. (Cl. 260—16)

This invention relates to nitrocellulose lacquers, particularly to light-colored lacquers which have improved resistance to discoloration from contact with mineral oils and greases and road tar.

Lacquers comprising nitrocellulose, oil-modified alkyd resin and plasticizer are used extensively as the topcoat lacquer on automobile bodies. During manufacture, these coatings come in contact with oils and greases, particularly the oils used in rubbing compounds. In service, they come in contact with lubricating oils and greases and road tar. Prolonged contact with any of these materials frequently produces a discolored spot in the coating. The discoloration is apparent when the offending substance is wiped off, it is usually yellow, and it is particularly objectionable when the original color of the coating is light, e. g. white or a light-colored tint.

The principal object of this invention is to improve the resistance of nitrocellulose lacquers to this kind of discoloration.

Another object is to do so without interfering with the other important requirements of lacquers of this type, such as outdoor durability, resistance to blistering, and resistance to cracking in cold weather.

These objects are accomplished by providing a liquid coating composition comprising lacquer grade nitrocellulose, alkyd resin modified with 25%–35% by weight of a member of the group consisting of coconut oil and coconut oil fatty acids, plasticizer, and volatile organic solvent, said plasticizer having a boiling point above about 325° C., having a solubility in water at 25° C. of less than 0.005% by weight, and producing a cloudy mixture when mixed with an equal weight of n-hexane, e. g. 10 grams of plasticizer mixed uniformly with 10 grams of n-hexane.

The amount of coconut oil or coconut oil fatty acids chemically combined in the alkyd resin is critical and must be between 25% and 35% by weight of said resin. Alkyd resins containing less than about 25% of this type modifier impart sufficiently less durability and more thermoplasticity to the lacquer coatings to make them undesirable for commercial use, such as on automobile bodies. Alkyd resins containing more than about 35% of this type modifier adversely affect the oil stain resistance of the lacquer coatings so that the desired results of this invention are not obtained.

The type of plasticizer employed in this invention is likewise critical. The boiling point must be above about 325° C. so that the plasticizing effect is substantially permanent in the thin coatings normally used. The plasticizer must also have an unusually low solubility in water to prevent water permeability of the coating and the resultant blistering. However, the most important property of the plasticizers of this invention which distinguishes them from plasticizers in general is insolubility in aliphatic hydrocarbons, characterized by cloudiness of a mixture of equal parts by weight of the plasticizer and n-hexane. Plasticizers which form clear solutions in this test do not provide the degree of oil stain resistance required of the lacquers of this invention.

The boiling point, water solubility and n-hexane solubility of a variety of plasticizers and plasticizer mixtures are provided in the following table:

TABLE 1

| | Boiling Point, 760 mm. Hg | Solubility in Water at 25° C., percent | Mixture with equal weight of n-hexane |
|---|---|---|---|
| (a) 2-ethyl hexanediol adipate polyester | Cannot be distilled. | <0.005 | Cloudy. |
| (b) Propylene glycol sebacate polyester | ___do___ | 0.00045 | Do. |
| (c) Propylene glycol adipate polyester | ___do___ | <0.005 | Do. |
| (d) Methyl phthalyl ethyl glycolate | 310° C | 0.09 | Do. |
| (e) Ethyl phthalyl ethyl glycolate | 320° C | 0.0175 | Do. |
| (f) Dibutyl phthalate | 340° C | 0.001 | Clear. |
| (g) Dimethyl phthalate | 282° C | 0.40 | Do. |
| (h) Benzyl butyl phthalate | 370° C | 0.0003 | Do. |
| (i) Dioctyl phthalate | >325° C | <0.005 | Do. |
| (j) Butyl cyclohexyl phthalate | >325° C | <0.005 | Do. |
| (k) 70% a, 30% h | >325° C | <0.005 | Cloudy. |
| (l) 57% a, 43% h | >325° C | <0.005 | Do. |
| (m) 50% a, 50% h | >325° C | <0.005 | Do. |
| (n) 30% a, 70% h | >325° C | <0.005 | Do. |
| (o) 50% b, 50% h | >325° C | <0.005 | Do. |
| (p) 50% c, 50% h | >325° C | <0.005 | Do. |

It is seen from these data that the plasticizers which meet all of the requirements are polyesters or mixtures containing a substantial proportion of polyester, i. e. a, b, c and k through p. Subsequently in the description of this invention, the use of these latter named plasticizers in oil stain resistant lacquers will be set forth in specific examples.

It has been found that nitrocellulose lacquers which are based on an alkyd resin described above but use a plasticizer which fails to meet the aliphatic hydrocarbon insolubility requirement do not provide suitable oil stain resistance. Likewise the use of a proper plasticizer with an alkyd resin other than the type described above does not provide suitable oil stain resistance. The improved products of this invention must contain both the right type of alkyd resin and the right type of plasticizer as defined above. Although the lacquers may contain minor amounts of alkyd resin and/or plasticizer not meeting these requirements, obviously such ingredients may not be used in any proportion which defeats the purpose of the invention.

The following examples are provided to illustrate this invention, but it is not limited thereby. Unless otherwise indicated, the parts and percentages are by weight.

Example 1

PREPARATION OF ALKYD RESIN

A 30% coconut oil modified alkyd resin of this invention was prepared by placing 1567 parts by weight of coconut oil and 457 parts of glycerine in a closed resin kettle equipped with a thermometer, agitator and reflux condenser with water trap. The charge was heated to 300° F. under a carbon dioxide blanket which was maintained during the balance of the process. Then 1 part of litharge was added and the charge was heated to 450° F. and held until a sample of the charge formed a clear 30% solution in 23A denatured alcohol. Then 2472 parts of phthalic anhydride were added. When this had melted, 222 parts of xylene and 1044 parts of glycerine were added to the charge, and the water trap in the condenser was filled with xylene. The charge was refluxed at 410°–420° F. until the solids had an acid number of 3–4, whereupon heating was discontinued and 2388 parts of xylene were added. When the charge had cooled to below 250° F., 870 parts of butyl alcohol were added.

The resulting alkyd resin solution contained about 60% solids and had a Gardner-Holdt viscosity of about T at room temperature. The resin solids contained 30% of chemically combined coconut oil and unesterified hydroxyl groups equivalent to 8.86% of glycerine, the remaining 61.14% being considered as completely esterified glycerine and phthalic anhydride.

PREPARATION OF LACQUER

An oil strain resistant lacquer of this invention having the following formula was prepared by grinding the pigment with a portion of the alkyd resin solution to produce a smooth dispersion and mixing the resulting dispersion with a solution of the remaining ingredients:

| | Parts by weight |
|---|---|
| Lacquer grade nitrocellulose (half-second viscosity) | 12.6 |
| Alkyd resin prepared above (solids) | 8.1 |
| 2-ethyl hexanediol adipate polyester plasticizer | 6.5 |
| Titanium dioxide pigment | 11.3 |
| Solvents and diluents | 61.5 |
| | 100.0 |

The essential properties of the plasticizer appear in the foregoing Table 1.

This lacquer was retained for subsequent testing.

*Examples 2–9*

Eight additional oil stain resistant lacquers of this invention were prepared as in Example 1 using the proportions prescribed therein except that different plasticizers or mixtures thereof meeting the requirements of this invention, as recorded in the foregoing Table 1, were substituted on an equal weight basis for the plasticizer of Example 1, as follows:

Example 2:                       Parts by weight
    2-ethyl hexanediol adipate polyester _____ 4.55
    Benzyl butyl phthalate _____ 1.95

Example 3:
    2-ethyl hexanediol adipate polyester _____ 3.7
    Benzyl butyl phthalate _____ 2.8

Example 4:
    2-ethyl hexanediol adipate polyester _____ 3.25
    Benzyl butyl phthalate _____ 3.25

Example 5:
    2-ethyl hexanediol adipate polyester _____ 1.95
    Benzyl butyl phthalate _____ 4.55

Example 6: Propylene glycol sebacate polyester ____ 6.5

Example 7:
    Propylene glycol sebacate polyester _____ 3.25
    Benzyl butyl phthalate _____ 3.25

Example 8: Propylene glycol adipate polyester ___ 6.5

Example 9:
    Propylene glycol adipate polyester _____ 3.25
    Benzyl butyl phthalate _____ 3.25

CONTROL LACQUERS A, B, C, D

Four "control" lacquers were prepared to show the adverse effect on oil stain resistance of using the wrong kind of alkyd resin and/or the wrong kind of plasticizer. They were prepared as in Example 1, using the proportions described therein except that the following materials were substituted on an equal weight basis for the corresponding materials in Example 1:

Control Lacquer A:                Parts by weight
    Benzyl butyl phthalate plasticizer _____ 6.5

Control Lacquer B: Dibutyl phthalate plasticizer ___ 6.5

Control Lacquer C:
    52.8% coconut oil modified alkyd resin containing unesterified hydroxyl groups equivalent to 3.2% glycerine _____ 8.1

Control Lacquer D:
    52.8% coconut oil modified alkyd resin containing unesterified hydroxyl groups equivalent to 3.2% glycerine _____ 8.1
    Dibutyl phthalate plasticizer _____ 6.5

The oil stain resistance of the lacquers of Examples 1–9, representing the products of this invention, and the Control Lacquers A–D, representing products outside the scope of this invention, was determined by thinning the lacquers to spraying viscosity, spraying coatings about 2 mils thick (when dry) on separate clean steel panels, force-drying them at 180° F. for 20 minutes, and cooling them to room temperature. Then hypoid gear oil and cup grease were applied separately to the coatings to cover areas about the size of a silver half dollar and were left in contact with the coatings for 16 hours at room temperature, about 77° F. At the end of this period the panels were wiped clean and examined in bright sunlight for discoloration from the oil and grease.

Based on the scale of 10=no stain, 9=excellent, 8=acceptable for automobile lacquers, and below 8=not acceptable; the products tested had the following ratings:

TABLE 2

| | Example | | | | | | | | | Control | | | |
|---|---|---|---|---|---|---|---|---|---|---|---|---|---|
| | 1 | 2 | 3 | 4 | 5 | 6 | 7 | 8 | 9 | A | B | C | D |
| Stain Rating | 9 | 9 | 9 | 8.5 | 8 | 9.5 | 9 | 10 | 9.5 | 7.5 | 6 | 4 | 2 |

In related experiments it was determined that other alkyd resins modified with 25%–35% of coconut oil or coconut oil fatty acids could be substituted for the alkyd resin used in Examples 1–9 to produce lacquers having equivalent oil stain resistance. Examples of such alkyd resins are "Rezyl" 92—5 (30% coconut oil), "Rezyl" 99—4 (34% coconut oil), and "Beckosol" 1323—60 (32% coconut oil).

It will be obvious to those skilled in the lacquer and alkyd resin arts that the 25%–35% coconut oil modified alkyd resins required in this invention may be prepared by the specific method disclosed in Example 1 or by other well known methods, such as the method used in the examples of Robinson U. S. Patent 2,123,206, or the fusion method in the absence of reflux solvent. Furthermore, the alkyd resins may be prepared at other solids concentrations such as 40%, 50% or 70%. Although glycerine is the preferred polyhydric alcohol, others such as sorbitol, pentaerythritol, and ethylene glycol may be substituted for all or part of the glycerine. Likewise, although phthalic anhydride or orthophthalic acid is the preferred polybasic acid, other forms of phthalic acid such as isophthalic acid may be used. Other polybasic acids commonly used in alkyd resins may be employed, preferably as a small proportion of the polybasic acid component.

The preferred amount of coconut oil or coconut oil fatty acids chemically combined in the alkyd resins is about 28%–32% by weight of the resin solids. The preferred acid number of the alkyd resin solids is about 2—10.

Alkyd resins as defined above may be substituted for all or part of the alkyd resins used in the examples.

Likewise other plasticizers or mixtures thereof meeting the requirements of the plasticizers of this invention may be substituted in the examples in the same or different proportions to produce lacquers having oil stain resistance equivalent to the products of the examples.

It will be obvious to those skilled in the lacquer art that grades of nitrocellulose commonly used in lacquers, such as one-eighth second, one second, and even lower or higher viscosity grades may be substituted in the same or different proportions for the half-second grade used in the examples. The preferred grade has a viscosity in the range of one-quarter to one-half second.

For purposes of simplicity and direct comparison, only one set of proportions of the three types of organic film-forming material required in this invention was used in the examples, namely 46.3% of nitrocellulose, 29.8% of alkyd resin and 23.9% of plasticizer, by weight, based on the total of these ingredients. It will be obvious to those skilled in the lacquer art that a wide range of other ratios may be used in the products of this invention, such as 35%–55% of nitrocellulose, 15%–45% of alkyd resin, and 10%–40% of plasticizer by weight based on the total of these three ingredients. Proportions within these ranges may be substituted for the proportions used in the examples. The preferred proportions are about 40%–50% of nitrocellulose, 20%–35% of alkyd resin and 20%–30% of plasticizer.

The invention is obviously not limited to the titanium dioxide used as an illustrative pigment in the examples. Other well known pigments may be substituted for all or part of the titanium dioxide in the examples or may be used in other proportions well known in the art. Such pigments include metal oxides, hydroxides, chromates, silicates, sulfides, sulfates and carbonates, carbon blacks, organic dyestuffs and lakes thereof, and metal flake pigments like aluminum. However since the primary object of this invention, i. e. oil stain resistance, is needed mostly in light-colored lacquers, the improvements provided by this invention are most useful in lacquers made with whate pigments or blends thereof with small amounts of colored pigments to produce light tints.

The invention is also applicable to clear unpigmented lacquers which are conveniently made by merely blending the film-forming materials, solvents and diluents without any pigment.

Any of a wide variety of solvents and diluents commonly employed in the organic coating art may be used in the lacquers of this invention, such as aliphatic and aromatic hydocarbons, alcohols, ketones and esters.

As indicated in the examples, metallic driers, accelerators, inhibitors, dispersing agents, surface active agents and similar commonly employed additives are not required in the lacquers of this invention. However, they may be used in small amounts where their addition contributes to a desirable property.

The products of this invention may be applied by well known means such as spraying, dipping and brushing. They may be air dried at normal painting temperature or force dried at elevated temperatures, such as 100°–200° F.

The products of this invention are useful for coating a wide variety of wood, metal, or other type articles. They are particularly useful for coating suitable primed automobile bodies which are susceptible to staining from oil, grease, tar and the like, in which case the lacquers of this invention provide a novel degree of resistance to such staining.

Many widely different embodiments of this invention may be made without departing from the spirit and scope thereof. Therefore, it is not intended to be limited except in accordance with the appended claims.

We claim:

1. A liquid coating composition, which produces a dry light-colored coating characterized by resistance to discoloration from contact with oil, grease or tar, comprising lacquer grade nitrocellulose, alkyd resin modified with 25%–35% by weight of a member of the group consisting of coconut oil and coconut oil fatty acids as the only oil modifier in said resin, polyester plasticizer of the class consisting of 2-ethyl hexanediol adipate, propylene glycol sebacate and propylene glycol adipate, and volatile organic solvent, said plasticizer having a boiling point above about 325° C., having a solubility in water at 25° C. of less than 0.005% by weight, and producing a cloudy mixture when mixed with an equal weight of n-hexane.

2. A product of claim 1 in which the nitrocellulose, alkyd resin and plasticizer are present in the following proportions by weight based on the total of these three ingredients:

| | Percent |
|---|---|
| Nitrocellulose | 35–55 |
| Alkyd resin | 15–45 |
| Plasticizer | 10–40 |

3. A product of claim 1 in which the nitrocellulose, alkyd resin and plasticizer are present in the following proportions by weight based on the total of these three ingredients:

| | Percent |
|---|---|
| Nitrocellulose | 40–50 |
| Alkyd resin | 20–35 |
| Plasticizer | 20–30 |

4. A product of claim 1 in which the alkyd resin is modified with 28%–32% by weight of a member of the class consisting of coconut oil and coconut oil fatty acids.

5. A product of claim 1 in which the plasticizer is 2-ethyl hexanediol adipate polyester.

6. A product of claim 1 in which the palsticizer is propylene glycol sebacate polyester.

7. A product of claim 1 in which the plasticizer is propylene glycol adipate polyester.

8. A product of claim 1 containing benzyl butyl phthalate plasticizer in addition to said polyester plasticizer, the mixture of said plasticizers having a boiling point above about 325° C., having a solubility in water at 25° C. of less than 0.005% by weight, and producing a cloudy mixture when mixed with an equal weight of n-hexane.

9. An article having a dry coating of a product of claim 1.

10. A product of claim 1 further containing pigment.

11. An article having a dry coating of a product of claim 10.

References Cited in the file of this patent

UNITED STATES PATENTS

| 2,173,430 | Vogel | Sept. 19, 1939 |
| 2,223,575 | Pitman | Dec. 3, 1940 |
| 2,417,405 | Bellac | Mar. 18, 1947 |
| 2,544,237 | Reese | Mar. 6, 1951 |